No. 611,295. Patented Sept. 27, 1898.
C. M. TOWNE.
BOX FASTENER.
(Application filed Nov. 8, 1897.)
(No Model.)
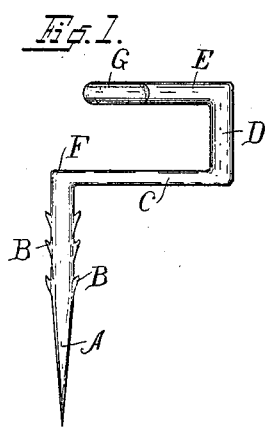
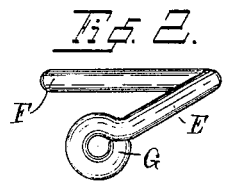
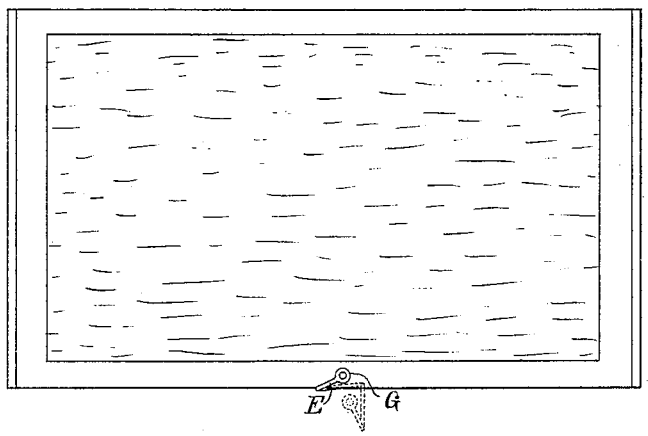
Witnesses.
J. A. Otto.
Winnifred Timlin.
Inventor.
Carroll M. Towne
By Erwin Wheeler & Wheeler
Attorneys

UNITED STATES PATENT OFFICE.

CARROLL M. TOWNE, OF MILWAUKEE, WISCONSIN.

BOX-FASTENER.

SPECIFICATION forming part of Letters Patent No. 611,295, dated September 27, 1898.

Application filed November 8, 1897. Serial No. 657,756. (No model.)

*To all whom it may concern:*

Be it known that I, CARROLL M. TOWNE, a citizen of the United States, residing at Milwaukee, in the county of Milwaukee and State of Wisconsin, have invented new and useful Improvements in Box-Fasteners, of which the following is a specification.

My invention relates to improvements in box-fasteners, and pertains especially to that class of fasteners which are designed to be used to secure the lids of cigar-boxes and for similar purposes.

The object of my invention is to provide a form of box-fastener which may be driven into a support in the same manner as an ordinary tack and rotated to secure thereto the object to be supported or held.

In the following description reference is had to the accompanying drawings, in which—

Figure 1 is an enlarged side view of my invention. Fig. 2 is a top view of the same. Fig. 3 is a top view of a cigar-box, showing my fastener as it is applied thereto.

Like parts are identified by the same reference-letters throughout the several views.

For convenience I have shown and described my improved fastener as it is applied to cigar-boxes; but it will be understood that it may be used for a variety of analogous purposes.

My fastener is formed with a pointed shank A, provided with upwardly-extending barbs B and having a laterally-projecting portion C, with a raised portion D at or near its outer end, from which a holding arm or part E extends in a position to engage upon the upper surface of the box-cover or other object to be held when the fastener is rotated upon its shank. With this construction it is obvious that the fastener-shank may be driven into a support directly underneath the object to be held, the latter being then closed down upon the upper end of the shank and the fastener rotated to cause the holding-arm to engage upon its upper surface, as illustrated in Fig. 3.

The arm E of the fastener is preferably located at an angle to the part C, thus leaving the end F of the shank exposed to facilitate driving the latter into its support and also providing for a better engagement on the cover of the box than would be obtained if the parts E and C were parallel. Where the fastener is made of wire, as shown in the drawings, the end of the arm E is preferably bent into a loop G, which increases its bearing on the box-cover and gives a neat appearance to the fastener. The fastener, however, may be formed of any suitable material, and the parts C, D, and E may, if desired, be formed in a variety of ornamental shapes suitable to the attainment of the desired result without departing from the scope of my invention.

It is obvious that my improved box-fastener may not only be used as a tack for originally securing the parts together, but that it will when in place also serve as a latch, being rotated outwardly to the position in which it is shown by dotted lines in Fig. 3 to permit the cover to open and backwardly upon the cover when the latter is again closed. The use of the barbs B is very important in the performance of this function, as they prevent the tack from becoming loose and drawing out after being repeatedly used.

Having thus described my invention, what I claim as new, and desire to secure by Letters Patent, is—

1. A fastener for boxes and similar articles of manufacture comprising a shank, a laterally-projecting portion, a raised portion extending from the laterally-projecting portion, and a holding arm or part extending from the raised portion and adapted, when the fastener is rotated upon its shank, to engage the object to be held, substantially for the purpose set forth.

2. A fastener for boxes and similar articles of manufacture, comprising a shank, a laterally-projecting portion, a raised portion extending from the laterally-projecting portion, and a holding arm or part extending from the raised portion at an angle to the laterally-projecting portion, and adapted when the fastener is rotated upon its shank, to engage the object to be held, substantially for the purpose set forth.

3. A fastener for boxes and similar articles of manufacture, comprising a barbed shank, a laterally-projecting portion, a raised portion extending from the laterally-projecting portion, and a holding arm or part extending from the raised portion at an angle to the laterally-projecting portion, and adapted, when the fastener is rotated upon its shank, to engage the object to be held, substantially for the purpose set forth.

In testimony whereof I affix my signature in the presence of two witnesses.

CARROLL M. TOWNE.

Witnesses:
JAS. B. ERWIN,
LEVERETT C. WHEELER.